June 16, 1936.  E. S. CORNELL ET AL  2,044,604
BUS CLAMP
Filed Aug. 1, 1931  2 Sheets-Sheet 1
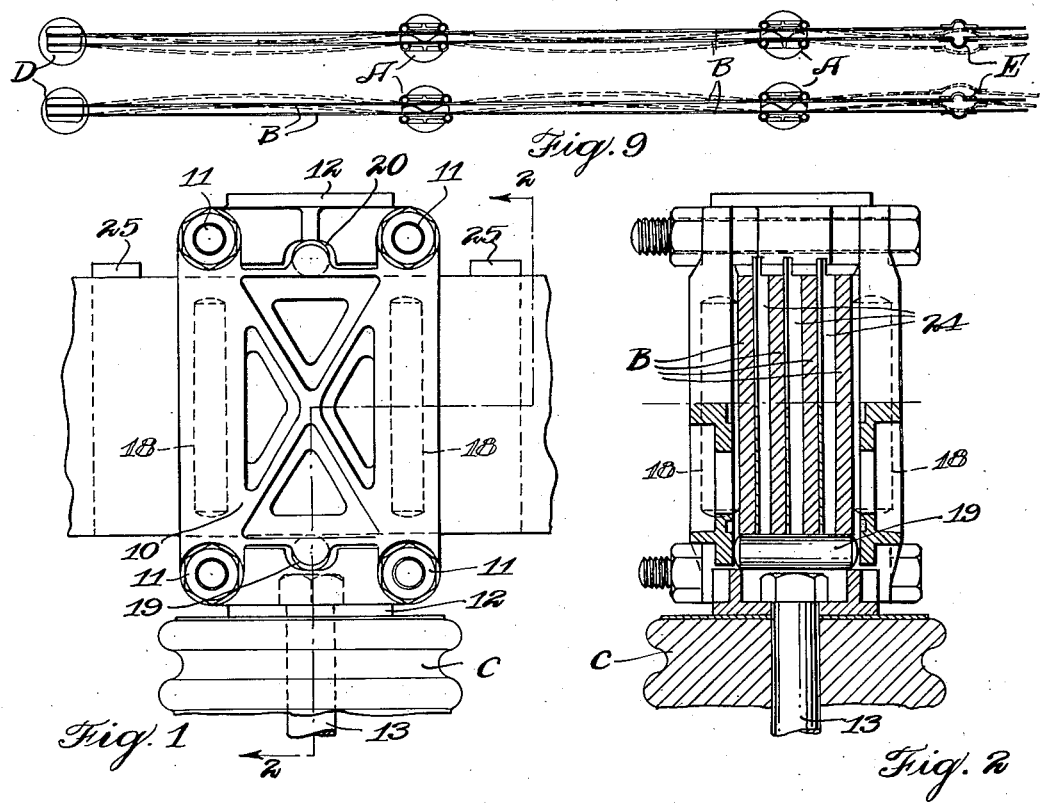
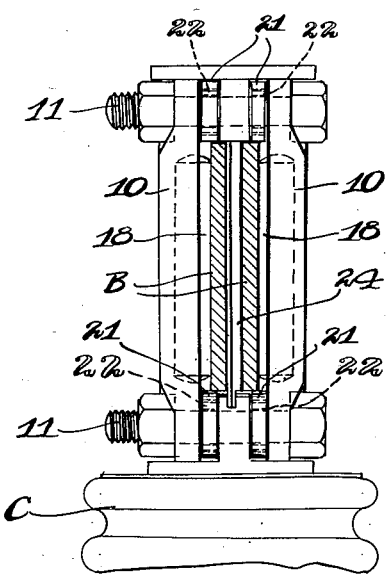
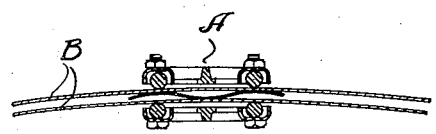
Inventor
Elias S. Cornell
Henry D. Freitag
Philip Sporn
By Howard Lasche
Attorney June 16, 1936.  E. S. CORNELL ET AL  2,044,604
BUS CLAMP
Filed Aug. 1, 1931  2 Sheets-Sheet 2
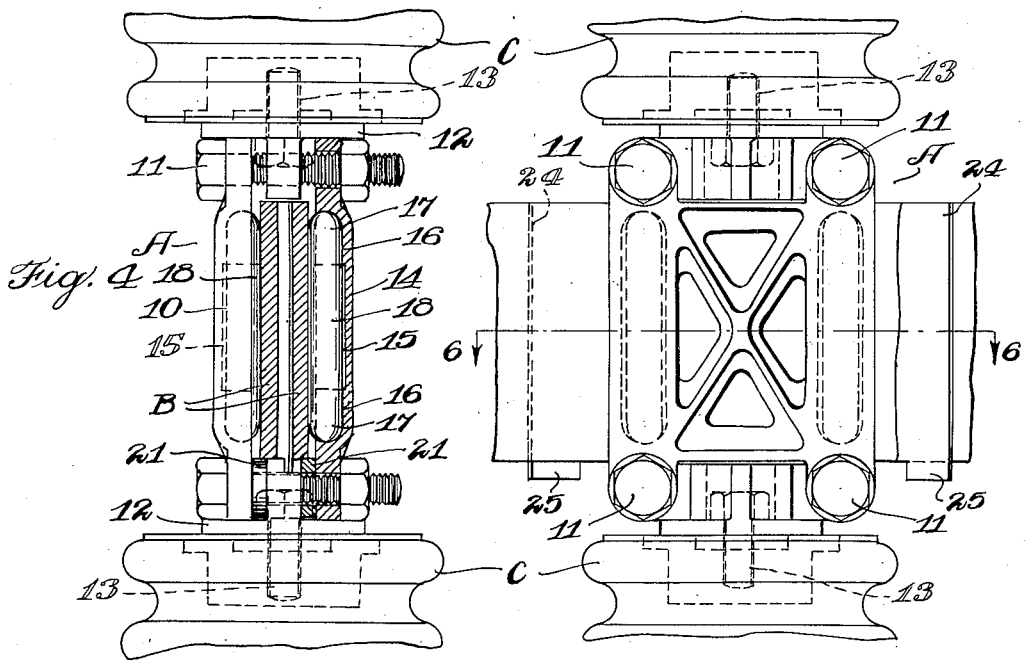
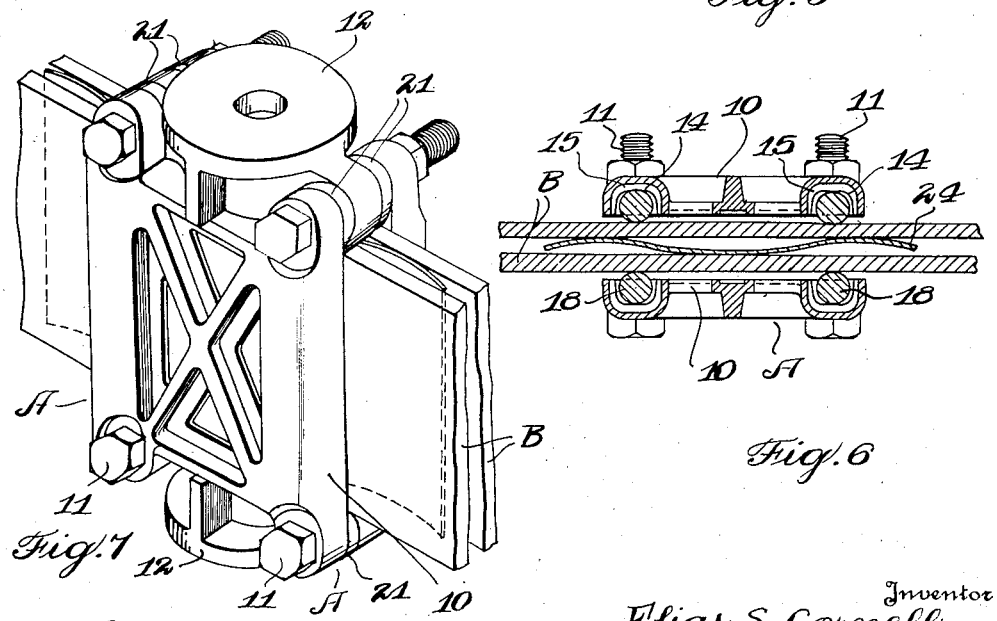
Inventor
Elias S. Cornell
Henry D. Freitag
Philip Sporn
By
Attorney Patented June 16, 1936

2,044,604

UNITED STATES PATENT OFFICE 2,044,604

BUS CLAMP

Elias S. Cornell, Chicago, Ill., and Henry D. Freitag, Long Island, and Philip Sporn, Brooklyn, N. Y.; said Cornell assignor to Delta-Star Electric Company, Chicago, Ill., a corporation of Illinois Application August 1, 1931, Serial No. 554,432

6 Claims. (Cl. 173—251)

This invention relates to bus bar clamps designed to support bus bars in a manner so that they may move freely for expansion and contraction, taking care of the temperature changes without undue strain on the supporting parts and bars.

A feature resides in providing clamping or supporting means for bus bars to avoid vibration noises and singing arising from alternating magnetic fields in adjacent bars or laminations of the bus run. While the bus bars must be held firm, it is necessary to allow the same to slide through the clamps in order to take care of temperature changes. To accomplish the desired results it is essential that certain spring tension be maintained between the bars in the form of spring spacers and that undue friction in the clamp be overcome.

We have designed a bus bar clamp or support including anti-friction rollers which permit the bus bars to slide freely and this roller means in conjunction with spring spacers holds the bus bars slidable within the clamp and yet under firm spring tension which allows free expansion and contraction of the bus runs without setting up dangerous cantilever stresses on the supporting insulators. This structure prevents rattle and vibration of the bus under normal operation and cushions the effect of short circuits on the individual bus bars and also allows a pre-determined pressure between bars independent of field conditions.

With this bus support aluminum busses can be used to greater advantage with safety, even though there is a great expansion and contraction.

The parts may be made of any suitable material, such as stainless steel or bronze, with a smooth finish, while the clamping plates and base portions may be made of malleable iron or other suitable material. In high capacity busses all of the parts including the bolts should be of non-magnetic metals to prevent magnetic heating.

The bus clamp is designed to provide supporting recesses for the anti-friction rollers in the side plates and a space in the base for anti-friction rolls. In some cases the clamping bolts may support bushings and roller washers rather than having a roller for the bottom edge of the bus bars. The flat spacer springs provide the desired tension between the bars and hold the same separated, directing a resilient tension against the rollers in the clamp.

It is an important feature of our invention that our clamp compensates for short circuit stresses, heating, and expansion. In long bus runs, it is necessary to interpose expansion joints to compensate for the expansion and contraction arising from electrical heating of the bars as well as changes in ambient temperature. Therefore one span of bars, although supported on several supports, will be fixed to only one of them at one point, which is generally at the middle, but may be at one end. Short circuit stress acting between opposite phases will accordingly throw the spans apart or together, depending upon the direction of flow of current through the various spans. This deflection causes an appreciable creepage of the bars through their intermediate supports, and unless there is very good provision to allow the bars to slide and equalize the bending stress on each span, the longitudinal stress on the end support may be dangerously high. Our clamp construction, embodying rollers, permits this short circuit deflection to take place without any undue stress or strain on the supports, and allows the natural resiliency of the bars to restore the same to natural position freely, when the cause of such short circuit stress is removed.

It is also a feature of our invention that the rollers provide rounded edges over which the bars, either straight or deflected, may pass. Ordinary clamps bind the bars at the clamp edges when the bars are deflected, throwing a high stress on the fixed support. It is also true when several bars are in the same phase run, the rounded edges of the spring spacer cushions the attractive force between them and permits longitudinal free slip of the bars, without binding. Our clamps thus overcome many of the objectionable features of clamps manufactured heretofore.

In the drawings forming part of this specification:

Figure 1 is a side elevation of a form of our bus bar clamp.

Figure 2 is a section on the line 2—2 of Figure 1.

Figure 3 is a section of another form of the clamp.

Figure 4 illustrates a similar form to Figure 3, with spacers on the clamping bolts instead of roller washers.

Figure 5 is a side view of the structure of Figure 4.

Figure 6 is a section on the line 6—6 of Figure 5.

Figure 7 is a perspective of the structure of clamp illustrated in Figures 4 and 5.

Figure 8 illustrates a form of spring anti-friction roller.

Figure 9 is a diagrammatic view of a portion of a bus run, illustrating the deflection of bars under short circuit.

Figure 10 is a sectional view through one of the clamps illustrating the position of the bars through the clamp under short circuit.

The clamp A is constructed with side plates 10 which are held in position by the bolts 11 on either side of the bus bars B.

The clamp or support A is provided with base or end portions 12 which are adapted to connect to the insulator C by means of a bolt such as 13, or in any other suitable manner to anchor the bus clamp A to the insulator.

The side plates 10 are provided with roller recesses 14 which are cut away at 15 at the center and provided with end bearing portions 16 to support the ends 17 of the anti-friction rollers 18 to permit the rollers to move freely in expansion and contraction of the bus bars B. The recess 14 and the bearings 16 are clearly illustrated in Figure 4.

The lower edges of the bus bars B may rest upon steel rollers, such as 19, illustrated in Figures 1 and 2, where a series of bus bars like B are held by the bus bar clamp A so as to provide a roller bearing. If it is desired, a roller such as 19 may be placed at the top of the clamp in a recess such as 20, illustrated in Figure 1, should it be desirable to have anti-friction means in the top of the clamp A. However, ordinarily, the roller 19 at the bottom in the similar recess 20 formed in the base 12 of the clamp is sufficient.

Where only two bus bars are used, like in Figure 4, extending through the clamp A, roller washers 21 may be carried by the bolts 11 to provide an anti-friction means for the edges of the bus bars B. In this construction as illustrated in Figure 4, the washers are held directly on the bolts 11. In Figure 3, we have illustrated a structure where suitable bushings such as 22 may be provided on the bolt 11, so that the washers 21 may be carried on these bushings 22. In either of these constructions, like in Figure 3 or Figure 4, the roller washers 21 are free to rotate with the longitudinal movement of the bus bars B in their expansion or contracting movement through the clamp A.

The bus bars B are held separated one from the other, by the leaf spring fillers 24. These leaf spring fillers or spring spacers 24 are of a construction as illustrated, having a width equal to the width of the bus bars B and formed with end shoulder portions 25 having a curved body nature and end portions adapted to provide a spring filler or spacer in leaf-like formation between the bus bars B. The structure of these springs is covered by another patent application.

Figures 9 and 10 illustrate the position of the bus bars B through the clamps A under normal and under short circuit conditions. Figure 9 illustrates in dotted outline the position of the bars B when short circuit occurs. The bars B are connected at one end fixed to the support D. The bars B cannot move longitudinally through the clamp D, but are held clamped securely at this end. An expansion joint E is formed at the other end for the purpose of connecting one series of bars B to the next series.

In Figure 9, the current through the various bars is in the proper direction to deflect the bars toward one another. As may be seen, this deflection separates the ends of adjacent series of bars quite materially, which separation is taken care of by the expansion joint. It may be seen that, where several supports are interposed between the fixed end and the expansion joint E, a very high strain would be exerted upon the support D unless the bars B could move longitudinally through the clamps A.

Figure 10 illustrates the manner in which the bars pass through the clamp A under this short circuit condition. The bars bear against the rollers entirely, and are spaced apart by means of the spring spacer. All contacts are over rounded surfaces, making it easy for longitudinal movement to take place. The rollers are sufficiently close to the edges of the clamp A so that for a maximum deflection, the bars will pass over the rollers, and will not contact the clamp edges.

The anti-friction roller 28 may be used in place of the anti-friction rollers 18, 19, or the washers 21. This anti-friction roll 28 is a helical spring and provides a means of forming a resilient anti-friction roll against which the electrical bus bars B may bear. The pressure against the bus bars B by the anti-friction rollers 28 may be of a resilient nature owing to the resiliency in the rollers 28. This resilient anti-friction roller 28 may also be used in place of the spring 24 to provide a spring anti-friction spacer between the electrical bus bars B. When used as a spacer between the bars B, one or more of these rolls may be used of the size desired, made of a suitable resilient spring material, and these rollers may be even connected in a series held together by any suitable means to hold a series or several of the rollers 28 connected together to provide the proper spring spacers between the bus bars B. When these rollers 28 are used to engage the bus bars B the electrical bus bars are held under spring tension by the anti-friction rollers 28 which are of a helical spring-like nature formed of any suitable spring material.

The structure of the clamp A may be made in its simplicity to provide recesses for the anti-friction rollers 18 and anti-friction rollers 19 may be provided for the edges of the bus bars or the roller washers such as 21, so that the bus bars B may be held firmly by the clamps A to overcome any undue strain through the clamps to the insulators C and to permit the bus bars to slide in a manner to expand and contract to take care of temperature changes. The structure of the bus bar support is such that aluminum busses may be used if it is desired, with perfect safety, in so far as expansion and contraction is concerned, and yet the bars will be held firm in the supports.

This form of bus support has the advantages as pointed out and is capable of supporting high capacity busses in a manner so as to prevent magnetic heating and to avoid vibration noises and singing arising from the alternating magnetic field in adjacent bars. The purpose of the clamp is to hold the bus bars firm, yet slidable to accommodate temperature changes and to space the bus bars apart so that the bus bars are cushioned in relation to each other and movable longitudinally, yet maintaining firm support for the bus runs such as cannot be accomplished by the old method of supporting the same. The overcoming of vibration noises and other detrimental features of the old form of clamping prevent the loosening of the clamps for the bus bars, and thus provides a material advantage in this form of structure over the prior art.

In accordance with the patent statutes, we have described the principles of our bus bar clamps and it is apparent that the illustrations are only suggestive of a means of carrying out the principles thereof, and the invention should be interpreted within the scope of the appending claims as defined by the foregoing specification.

We claim:

1. A bus clamp including end base members, a pair of side plates extending between said end base members, anti-friction roller recesses within said plates, anti-friction rollers positioned in said recesses, and clamping bolts extending both through said side plates and base members for holding said plates with said anti-friction rollers bearing against the sides of bus bars extending through said clamp.

2. A bus clamp for electrical bus bars including, opposed base members, clamping plates, bolts for connecting said clamping plates together and to said base members, anti-friction means carried in said clamping plates positioned to engage the sides of bus bars extending through said clamp, and anti-friction washer members carried by said bolts to support the edges of the bus bars extending through said clamp, whereby the bus bars may expand and contract freely without undue strain on the insulators connected to said base members.

3. A supporting device for electrical bus bars including side clamps, opposed end members secured to said side clamps and spacers to support the bus run, anti-friction engagers between said side clamps and the adjacent bus bars, and between said end members and the edges of the bus bars, positioned to engage the sides and edges of the bus bars supported by said device, and spring means for spacing the respective bus bars apart against said anti-friction means between said side clamps and the adjacent bus bars.

4. An electrical bus supporting device comprising end members, side members extending between said end members, clamping bolts connecting said members together, anti-friction means, interposed between the side members and the next adjacent bus, and between the clamping bolts and the bus bar edges, to engage the edges and sides of the electrical bus bars extending through said device, and means for holding the bus bars under spring tension against said anti-friction means between the side members and the next adjacent bus.

5. A bus support for electrical bus bars including end members, clamping plates extending between said end members, connecting means for clamping said end members and clamping plates together, anti-friction means supported by said clamping plates and said end members to engage the sides and edges of the bus bars extending through said support, and resilient anti-friction means adapted to space the bus bars apart and to hold the same resiliently against said anti-friction means engaging the bus bar sides.

6. A supporting device for bus bars including means for holding the bus bars in spaced relationship, means for supporting said holding means, means for securing said holding means to said supporting means, and anti-friction means interposed between said supporting means and opposite sides and edges of the bus bars.

ELIAS S. CORNELL.
HENRY D. FREITAG.
PHILIP SPORN.